March 12, 1963   R. BERTELSMANN   3,080,787
WALL PLUGS
Filed Dec. 10, 1957

INVENTOR.
ROLF BERTELSMANN
BY Bailey, Stephens + Huettig
ATTORNEYS

3,080,787
WALL PLUGS
Rolf Bertelsmann, Emmendingen, Baden, Germany, assignor to Max Langensiepen Kommandit-Gesellschaft, Emmendingen, Baden, Germany, a German firm.
Filed Dec. 10, 1957, Ser. No. 701,910
Claims priority, application Germany Dec. 29, 1956
4 Claims. (Cl. 85—2.4)

The present invention relates to new improvements in wall plugs made of fibrous or plastic material.

Prior to this invention there have been wall plugs of fibrous material which were enclosed by metallic casings in order to facilitate the insertion of the plugs into a hole in a wall. These known plugs with cylindrical shafts have the disadvantage that the hole which has to be drilled in the wall to receive such a plug may only be slightly larger than the outer diameter of the respective plug. This requires the availability of proper tools for making the plug holes, as well as screws of certain sizes which will pry the fibrous insert sufficiently apart to insure that the plug will remain firmly in the wall and resist a considerable tension. However, it has been demonstrated by numerous tests that the expansion effect of a screw is not sufficient to insure a firm fit of such a known wall plug, especially in a wall which consists of a soft, yielding building material.

It is further known to enclose the fibrous plug material in casings which for reasons of a more simple manufacture are provided with longitudinal slots. When a screw is inserted into such a plug, the fibrous material forced outwardly through the slots assists in holding the plug in the hole in the wall. These known plugs terminate at their inner end in a flat circular cup-shaped end plate of a diameter which corresponds to the outer diameter of the plug shaft. The longitudinal slots of this type of plug terminate at the front end at the point where the circular or cup-shaped plate begins. The expansion of the fibrous material through these slots is also in this case not sufficient to insure a firm hold of the plugs in the wall if the wall material is soft and yielding.

It is the principal object of the present invention to provide a wall plug which has sufficient grip even in a wall of soft, yieldable material to remain firmly seated therein.

The basic concept of the present invention is to provide a wall plug which is to be driven into a hole of a smaller diameter than that of the plug so that the plug will be compressed by such insertion or the material around the bore in the wall will be placed by the plug under such initial pressure that the final pressure of the plug produced by its expansion through the subsequent insertion of the screw will be so high that the plug will hold securely within the plug hole even though the wall material might be soft and yielding.

If, however, a plug with a cylindrical shaft and a blunt or cup-shaped end is driven into a bore of a diameter smaller than its own, the resulting deformation of the blunt or spherical end of the plug will offer considerable resistance to the insertion. The impact upon the head of the plug when being driven into such a small plug hole would therefore be transmitted through the cylindrical portions of the casing primarily upon the blunt or cup-shaped end. Consequently, these cylindrical portions would have to be made of very great strength since otherwise the plug would buckle while being driven into the wall. Such a reinforcement of the cylindrical portions of the plug casing would, on the other hand, prevent the plug from properly expanding when the screw is inserted and its hold in the bore would be due solely or almost entirely to the compression by the wall of the bore or to the tight fit of the plug within the bore.

It is therefore another object of the present invention to provide a wall plug which overcomes all of the above-mentioned disadvantages of the known wall plug designs and consists of an insert of a compressible material which is enclosed by a socketlike cylindrical casing which is provided with apertures in the form of longitudinal slots and is designed to be driven into a hole in a wall, the diameter of which is considerably smaller than the outer diameter of the cylindrical casing.

An essential feature of the invention resides in providing the wall plug with an insert of a suitable compressible material. The mentioned objects of the invention are therefore to be attained by basing the radial compressibility of the entire wall plug and the extent of such compressibility upon the compressibility of the insert, rather than upon the compressibility or other action of the cylindrical casing. This feature is, however, dependent upon another, namely upon a suitable design of the inner end portions of the plug. These end portions, which in the previous plug designs would resist a radial compression when the plug is driven into a smaller hole, will according to the invention be made of a shape which offers the least possible resistance to such radial compression.

Another important object of the invention is to design the inner end portions of the wall plug so that a radial compression of the insert will not result in any distortion or buckling of the outer casing or in the formation of wrinkles therein.

This object of the invention is attained by making the inner end of the plug casing, that is, the end portion which is to penetrate into the wall, of a substantially conical or tapered shape, by extending the longitudinal slot within the cylindrical wall of the casing so as to reach into the conical or tapered end portion, and by connecting the individual parts of this end portion merely by narrow webs. For this purpose, the inner tapered end of the plug casing may be provided with cutouts which extend transverse to the longitudinal slots and may be in the form of cross slots, or of a trapezoidal or heart shape. The casing parts may, however, also be made of at least two strips of sheet metal or plastic which are bent substantially in the shape of hairpins, the arms of which enclose the insert by being equally distributed along the periphery thereof, and the overlapping apex points of which are connected to each other at the tip of the plug. When the plug is driven into a smaller hole, this particular shape of the plug end permits the same to penetrate much more easily into such hole and to be more easily compressed since there are no solid portions resisting the driving force produced by an impact upon the head of the plug. When the plug is driven into a wall, the edges of the longitudinal slots can therefore easily approach each other even at the plug end, all parts of the casing can fit evenly against the wall of the plug hole, and the solid parts between the longitudinal slots can be compressed without much resistance into a cylinder of a smaller diameter.

The outer end of the plug housing is provided with an annular projecting edge portion which serves the purpose of restricting the depth of insertion of the plug into a wall and of covering up the outer edge of the plug hole which may have partly broken out by the drilling or punching of the hole or by the forcible insertion of the plug. The solid wall portions are preferably also provided with apertures which extend transverse to the longitudinal slots and facilitate the expansion of the plug when a screw is screwed into it after it has been driven into the wall, and allow the material of the insert to penetrate through these apertures and to engage with the wall of the plug hole.

The insert of the plug preferably consists of a suitable fibrous material or a suitable plastic.

Further objects, features, and advantages of the present invention will be apparent from the following detailed description thereof, particularly when read with reference to the accompanying drawings, in which—

FIG. 3 illustrates another modification in which the plug is provided with heart-shaped extensions of the longitudinal slots; while

Figure 1:
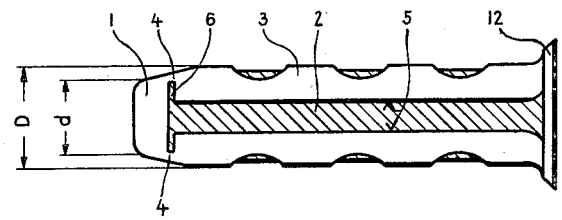
FIG. 1 illustrates one embodiment of a wall plug according to the present invention which is provided with transverse slots at the end of the longitudinal slots.

Referring to the drawings, and first particularly to FIG. 1, the outer casing of the wall plug according to the invention which is made of a malleable metal or a suitable plastic is provided with an inner end portion 1 in the form of a tapered cup, the end diameter $d$ of which is smaller than the minimum diameter of a plug hole which is drilled or driven into a wall and into which the plug is to be driven. Portions 3 of the casing which solidify the insert 2 of a suitable fibrous or plastic material are of a cylindrical shape and are connected to this cup-shaped end 1 by means of narrow webs 4. The outer diameter $D$ of this cylinder depends upon the particular use of the plug, the size of the screw to be inserted into it, and the outer tension which the plug is supposed to withstand or the weight which it is supposed to support. Portions 3 do not form the entire periphery of the plug but have two longitudinal slots 5 which terminate into transverse slots 6 within the tapered cup-shaped end 1, so that the casing portions 3 are connected to this end merely by the mentioned narrow webs 4. The outer ends of the cylindrical portions 3 all terminate into a circular ring 12 of a larger diameter which combines the individual portions 3 into a single body, forms a solid head which may be hit with a hammer to drive the plug into its smaller hole in a wall, then covers up the outer edge of the hole which by the drilling or punching operation might have slightly broken out and become unsightly, and prevents the entire plug from being driven too deeply into the plug hole.

Figure 2:
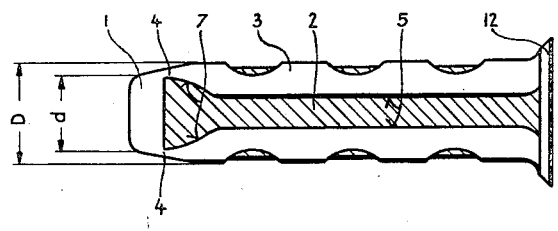
FIG. 2 illustrates a modification of the invention in which the plug is provided with trapezoidal extensions of their longitudinal slots.

The plug casing according to the embodiment of the invention as illustrated in FIG. 2 likewise has a tapered cup-shaped end portion 1 and is similar to the embodiment shown in FIG. 1, except for the fact that the inner ends of longitudinal slots 2 terminate into cut-outs 7 of a substantially trapezoidal shape rather than in transverse slots 6.

Figure 3:
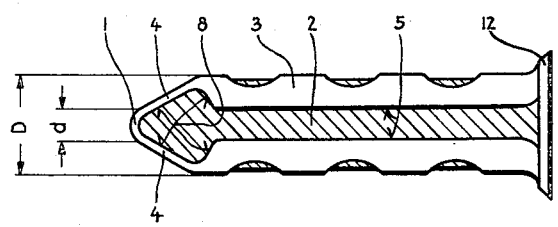

FIG. 3 illustrates a further modification of the invention in which the end or apex of the conical end 1 has a still smaller diameter $d$ and in which the largest part of this end 1 is taken up by a pair of heart-shaped cut-outs 8 which form the termination of the longitudinal slots 5 so that the solid part of the end only consists of a pair of narrow webs 4.

Figure 4:
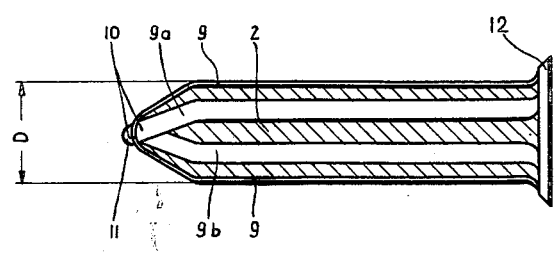
FIG. 4 illustrates a further modification in which the casing is formed of sheet metal strips which are bent substantially into a hairpin shape.

FIG. 4 finally illustrates that the outer reinforcement of the insert 2 of fibrous or plastic material does not have to consist of a slotted cylindrical casing but that it may be formed of several individual strips 9, 9a, and 9b of sheet metal or plastic which are bent into a shape similar to a hairpin. These strips enclose the fibrous or plastic insert 2 and together form a substantially cylindrical casing thereof, and their overlapping apexes 10 are connected to each other, for example, by a small rivet 11. The outer end of the plug is again formed by an enlarged head 12 which combines the individual strips 9, 9a, and 9b into a unit and limits the extent to which the plug can be driven into a wall.

When a wall plug according to the present invention is driven into a hole of a considerably smaller diameter the partly cylindrical portions 3 or the strips 9 are compressed and deformed to the diameter of the plug hole without resulting in any buckling or of wrinkles in the tapered end 1 or the longitudinal portions 3 or 9 of the plug. The plug hole may be made as small as the compressibility of the insert material 2 and the width of the longitudinal slots 5 will permit.

When using a wall plug of the new design, the following advantages will result: In a plug hole of a diameter greater than that of the plug, that is, in one into which the plug fits only loosely, the insertion of a thick screw will compress the fibrous insert in the axial direction and still produce a sufficient pressure to hold the plug securely pressed against the wall of its hole. The new plug is, however, especially adapted to be inserted into a hole of a diameter smaller than that of the plug casing. Only a thin screw is then required since the insert matereial will already be radially compressed by the wall of the narrow plug hole.

The outer reinforcement of the fibrous or plastic insert by the new type of plug casing allows a more extensive deformation of the plug and renders the same especially suitable for walls which consist of a softer building material. When the screw is inserted into the plug insert which has already been compressed by the wall of the plug hole and the striplike parts of the casing, a more forceful expansion effect will be attained than the plugs according to previous designs would permit.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A wall plug comprising a substantially cylindrical metallic casing having an annular projection at one end thereof and having a plurality of wide longitudinal slots therein dividing the same into at least two arcuate wall portions all connected to said annular projection, and an insert of compressible material within and substantially completely filling said casing for receiving a connecting means after insertion of said wall plug into a hole, said metallic casing having a tapered end portion including axially extending narrow strips connecting opposing ones of said arcuate wall portions, said slots extending into said tapered end portion, said strips forming at least parts of said tapered end portion, said tapered end portion being provided with cut-outs extending transverse to and joining said longitudinal slots providing weakened regions in said tapered end portion whereby, when said plug is driven into a hole of smaller diameter than the cylindrical casing, said tapered end portion is transformed by the wedging action of said hole of smaller diameter into a more cylindrical form of a smaller diameter than that of said cylindrical casing without creating wrinkles at the transition between said tapered end portion and said cylindrical wall portions and the wall portions will then be compressed by the camming action of said hole of smaller diameter into a cylindrical casing of a smaller diameter thus prestressing said compressible material within said casing.

2. A wall plug as defined in claim 1, in which said cutouts comprise slots.

3. A wall plug as defined in claim 1, in which said cutouts are of a substantially trapezoidal shape and have a greater width than said longitudinal slots.

4. A wall plug as defined in claim 1, in which said cutouts are of a substantially heart shape and have a greater width than said longitudinal slots.

References Cited in the file of this patent

UNITED STATES PATENTS

| | | |
|---|---|---|
| 1,066,040 | Osbourne | July 1, 1913 |
| 1,138,219 | Hottenrath | May 4, 1915 |
| 1,733,083 | Pleister | Oct. 22, 1929 |
| 1,746,963 | Pleister | Feb. 11, 1930 |
| 2,553,614 | Valluzzi | May 22, 1951 |
| 2,596,940 | Poupitch | May 13, 1952 |
| 2,713,284 | Bedford | July 19, 1955 |

FOREIGN PATENTS

| | | |
|---|---|---|
| 697,676 | France | June 19, 1930 |
| 802,493 | France | Sept. 5, 1936 |